March 23, 1965  A. DECHANT  3,174,638
AUTOMATIC AUTOMOBILE CARRIER FOR MECHANICAL GARAGES
Filed Nov. 19, 1962  2 Sheets-Sheet 1
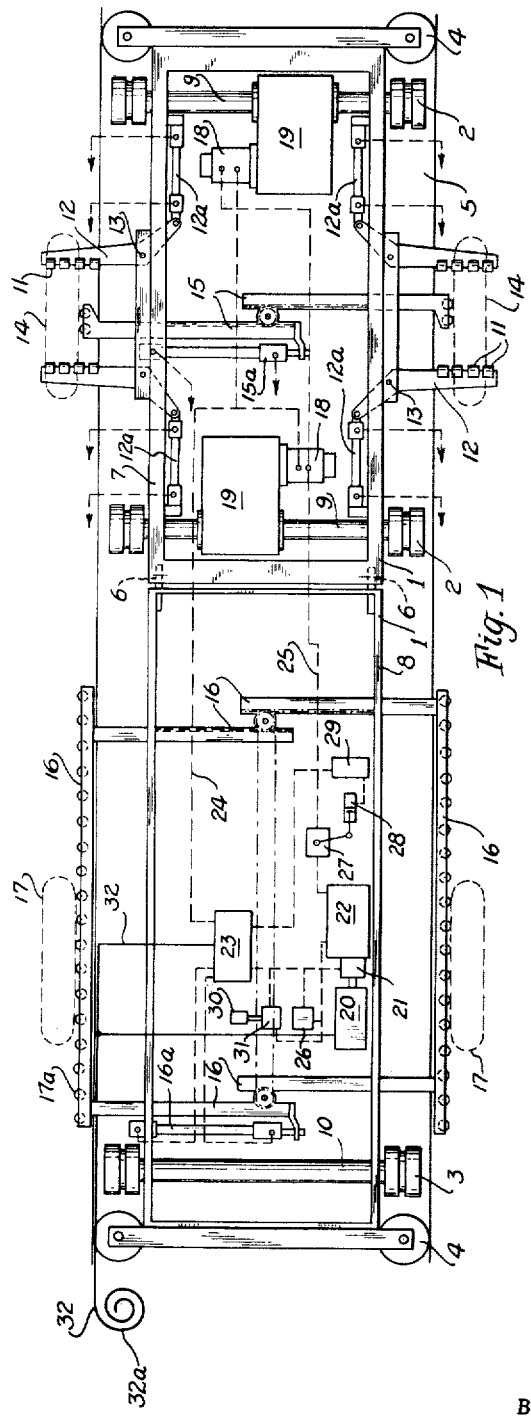
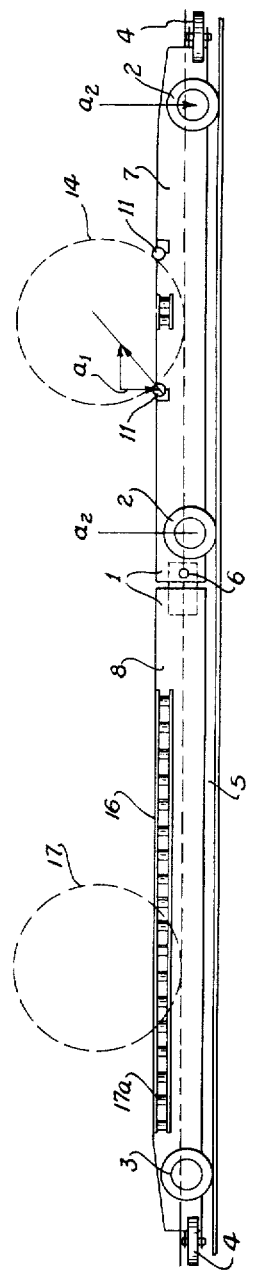
INVENTOR
Arnulf Dechant
BY Bailey, Stephens & Huettig
ATTORNEYS

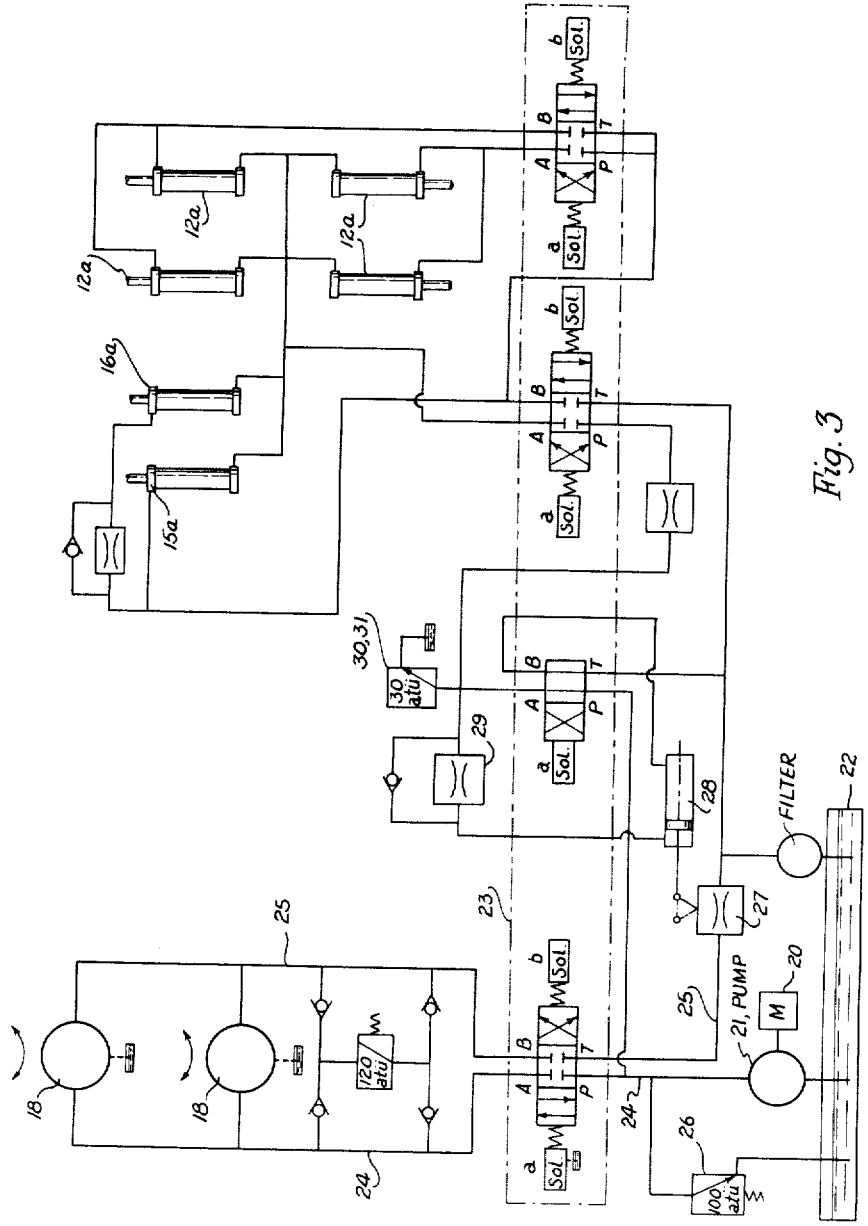

United States Patent Office 3,174,638
Patented Mar. 23, 1965

3,174,638
AUTOMATIC AUTOMOBILE CARRIER FOR MECHANICAL GARAGES

Arnulf Dechant, Gustavsburg, Hesse, Germany, assignor to Maschinenfabrik Augsburg-Nurnberg A.G., Nurnberg, Germany
Filed Nov. 19, 1962, Ser. No. 238,443
Claims priority, application Germany, Mar. 3, 1962, M 52,003
4 Claims. (Cl. 214—333)

This invention relates to an automobile carrier and, in particular, to an automatic automobile carrier for use in a mechanical garage.

Automobile carriers or transfer carriages are used in garages for transporting automobiles in a horizontal plane from one position to another. In so doing, automobile lifting or pick-up devices are installed in the carrier for automatically picking up a car at one place and moving it to another place. Such a carrier is propelled by one of two different types of drives. In the first drive, the carrier is moved by a rope installed in the lifting cage of the elevator, the rope being wound out or withdrawn as it necessary. In the second type, an automatic drive is installed in the carrier for driving the wheels supporting the carrier, which wheels frictionally engage the floor.

The rope drive type carrier is expensive but has excellent performance. The automatic drive type carrier has certain economical and operational advantages. On the other hand, difficulties are encountered in its construction and installation. The object of this invention is to avoid the difficulties occurring in the automatic drive type carrier, and also to improve its performance so that it is at least equal to that of the rope drive type carrier.

According to this invention, these objects are obtained, in general, in that a self-propelled automobile carrier is given a hydraulic oil drive for the automatic picking up and delivery of automobiles into or out of the stalls in mechanical garages. The driving and electrical control means are mounted on the carrier frame, and the energy needed for energizing the same is supplied by a single electric cable joined between the driving and the electrical control means and the source of electrical current. In a preferred construction of the hydraulic oil drive, two hydraulic motors are coupled in parallel and are provided with oil under pressure from a single pump assembly. Each motor drives a separate driving shaft of the carrier, respectively. The axle of the automobile being moved by the carrier is centered between the two driving shafts. The pump assembly for the carrier also furnishes oil pressure for actuating the automobile pickup and centering elements mounted on the carrier and used for the rear and front wheels of the automobile.

The means by which the objects of the invention are obtained are described more fully with reference to the accompanying drawings, in which:

FIGURE 1 is a plan view of the carrier frame with the hydraulic pipe lines shown in broken lines;

FIGURE 2 is a front elevational view of FIGURE 1; and

FIGURE 3 is a circuit diagram of the hydraulic system shown in broken lines in FIGURE 1.

In a mechanical garage, the vehicles are moved to the level of the individual stalls and also are returned by means of an elevator. An automobile carrier 1 is used for moving the automobile out of the elevator into a stall and vice versa. As shown in FIGURES 1 and 2, the carrier of this invention is composed of a frame mounted on wheels 2 and 3 and guide rollers 4 which engage the bottom and sides of the channel-shaped rails positioned in the elevator cage as well as in each stall.

According to this invention, the carrier frame 1 has links 6 which connect two rectangular frame portions 7 and 8. A pair of drive shafts 9 supports portion 7, one shaft being located adjacent each end of portion 7, respectively. Wheels 2 are joined to each shaft 9. Adjacent the free end of portion 8 is an idler axle 10 to which wheels 3 are joined.

In use, the carrier frame 1 is moved beneath an automobile, which is to ride on its own wheels, so that the transverse axis of portion 7 coincides with the axis or axle of one pair of wheels of the automobile, which may be either the front or rear wheels. This pair of wheels is engaged by a gripping and pick-up device. Rollers 11 mounted on arms 12 pivotally secured to frame portion 7 are swingable in a horizontal plane around vertical pivots 13. These arms 12 are operated by hydraulic pistons 12a. Preferably rollers 11 engage the rear wheels 14 of an automobile. Between the wheels are a pair of wheel separating rods 15, driven by a hydraulic piston 15a which, by being moved transversely to the longitudinal axis of the frame portion 7, serve to center and strengthen an automobile which may have been moved onto the carrier at an angle. At the free end of frame portion 8 is mounted wheel centering arms 16, actuated by hydraulic piston 16a, which are likewise transversely movable for centering and straightening the front wheels 17 of the automobile. Wheels 17 bear on rollers 17a carried by the centering arm 16.

When the rollers 11 of the gripper arms 12 engage the tires of the rear wheels 14 of an automobile, then each tire produces a vertical force component $a_1$, FIGURE 2, on the rollers 11, which force is almost evenly distributed onto the drive wheels 2 as the vertical forces $a_2$. These vertical forces $a_2$ add to the dead weight of the frame portion 7 so that the frictional contact between the wheels and the guide rails 5 is increased. This means that the centrifugal force on the wheels 2 can be increased, which results in that the acceleration and deceleration or braking force can be increased. This is of substantial importance in the semi- or fully-automatic operation of the hydraulic drive.

The hydraulic rear drive for the carrier is separated so that drive motors are mounted on frame portion 7, while the oil pump and control means are mounted on frame portion 8. In frame portion 7 are two hydraulic motors 18 coupled in parallel and each driving one drive shaft 9 through a mechanical transmission 19. Drive shafts 9 lie symmetrically on the opposite sides of the axle of the automobile being moved by the carrier so that shafts 9 are evenly loaded.

The pump assembly for the hydraulic motors 18 is mounted in frame portion 8 and is composed of one or more electric motors 20 joined to one or more hydraulic pumps 21 communicating with oil storage tank 22. Pump 21, as controlled by the electrically actuated control valve switching block 23, feeds oil through supply lines 24 to motors 18, from which the oil flows through return lines 25 back to storage tank 22. The output of pump 21 is controlled so that it corresponds to the oil consumption required by the two motors 18, which are coupled in parallel, during normal running and/or r.p.m.

In order to obtain a constant acceleration during the starting of the carrier frame 1, a predetermined oil pressure is maintained by means of a relief or by-pass valve 26 which is connected in line 24. In this way, an empty carrier, that is one not carrying an automobile, reaches its constant velocity in a shorter period of time than a carrier that is transporting an automobile. In order to drive the carrier to a predetermined stopping point with great accuracy and using semi- or fully-automatic control, the deceleration or braking of the carrier must also be constant, or as constant as possible, from the beginning of the deceleration to dead stop. For this purpose, a fluid volume control device 27 is inserted in the return line 25 where it is independent of pump pressure, and this first volume control is actuated by means of a hydraulic cylinder 28 which receives oil under pressure from a second fluid volume control 29 inserted in the oil supply line 24.

The highest required oil pressure in the hydraulic system is maintained by means of the relief valve volume control 26 only during carrier frame acceleration and if need be during the normal driving of the carrier, while during the remainder of the time during which pump 21 operates, a considerably lower pressure is produced by means of a second relief valve 31 which is operated by a solenoid 30. This means that unnecessary quantities of oil are not circulated under higher pressure and also that the small amount of oil in tank 22 is not overheated. Furthermore, electric motor 20 can be of less horsepower. During the period of time that relief valve 31 maintains a low pressure in the hydraulic system, the control valve switching block 23 actuates hydraulic cylinders 12a so that the arms 12 grip the wheels 14, while at the same time, the hydraulic cylinders 15a are actuated for centering the wheels 14 and hydraulic cylinders 16a are actuated for centering the front wheels 17 of the automobile.

The power for operating motor 20 and the valve switching block 23 is supplied by a single multi-wire electric cable 32 which extends to a rail 32a mounted in the elevator cage.

Having now described the means by which the objects of the invention are obtained, I claim:

1. In a self-propelled carrier for the automatic pick-up and delivery of automobiles into and out of the stalls in a mechanical garage having a carriage frame, driving and electrical control means mounted on said frame for moving said frame and including a pair of wheel-mounted drive shafts joined to said frame, hydraulic motors coupled in parallel and connected to said drive shafts, hydraulic pump means connected to said motors for driving said carrier, and automobile wheel gripping means centered between said drive shafts, the improvement comprising means for obtaining a substantially constant deceleration of a moving carrier including a hydraulic supply line and a hydraulic return line connecting said motors to said pump means, a first fluid volume control mounted in said return line independent of fluid pressure from said pump means, a second fluid volume control mounted in said supply line, a hydraulic piston cylinder joined to said second fluid volume control for activation thereby, and connecting means between said cylinder and said first volume control means for actuating said first volume control means in response to said second volume control means, and a single electric cable joined between said driving and electrical control means and a source of electric current for energizing said driving and electrical control means.

2. In a carrier as in claim 1, said frame comprising a first portion joined to said drive shafts and having said hydraulic motors symmetrically mounted thereon with each motor adjacent its respective drive shaft, a second portion, link means connecting said first portion to said second portion, and idler wheels for supporting an end of said second portion, whereby said first portion alone carries the weight of an automobile.

3. In a carrier as in claim 1, further comprising relief valve means coupled to said pump means for maintaining the maximum fluid pressure to said motor during acceleration and normal running of said carrier, and magnetically controlled by-pass valve means coupled to said pump means for maintaining a lower fluid pressure at other operative times for said carrier.

4. In a carrier as in claim 3, said by-pass valve being actuated to give a lower fluid pressure for activating said wheel gripping means, and said driving and electrical control means further comprising wheel centering means actuated at said lower fluid pressure.

References Cited by the Examiner
UNITED STATES PATENTS

| 2,070,793 | 2/37 | Kent | 214—16.1 |
| 2,846,186 | 8/58 | Smith | 214—16.1 X |
| 2,899,087 | 8/59 | Jacobsen | 214—16.1 |
| 2,904,197 | 9/59 | Asheim et al. | 214—16.1 X |
| 3,038,621 | 6/62 | Mitchell | 214—333 |

FOREIGN PATENTS

| 1,167,565 | 8/58 | France. |
| 820,838 | 9/59 | Great Britain. |

HUGO O. SCHULZ, *Primary Examiner.*